United States Patent
Helle

(10) Patent No.: US 6,694,152 B1
(45) Date of Patent: Feb. 17, 2004

(54) METHOD AND AN ARRANGEMENT FOR TREATING SUBSCRIBER DATA IN A MOBILE STATION

(75) Inventor: Seppo Helle, Paimio (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/394,000

(22) Filed: Sep. 10, 1999

(30) Foreign Application Priority Data

Sep. 11, 1998 (FI) .................................................. 981952

(51) Int. Cl.[7] ................................................ H04B 1/38
(52) U.S. Cl. .................... 455/558; 455/566; 455/556.2; 379/433.09; 707/102
(58) Field of Search ................................ 455/558, 414, 455/412, 566, 564, 565, 570, 575, 556, 344; 379/428.01, 433.09, 440; 707/102, 201, 509, 517

(56) References Cited

U.S. PATENT DOCUMENTS

| | | | |
|---|---|---|---|
| 4,868,846 A | 9/1989 | Kemppi | 379/144 |
| 5,266,782 A | 11/1993 | Alanara et al. | 235/380 |
| 5,315,638 A | 5/1994 | Mukari | 379/58 |
| 5,353,328 A | 10/1994 | Jokimies | 379/58 |
| 5,404,580 A * | 4/1995 | Simpson et al. | 455/558 |
| 5,448,622 A | 9/1995 | Huttunen | 379/58 |
| 5,479,476 A | 12/1995 | Finke-Anlauff | 379/58 |
| 5,487,084 A | 1/1996 | Lindholm | 375/215 |
| 5,544,246 A * | 8/1996 | Mandelbaum et al. | 705/65 |
| 5,600,708 A | 2/1997 | Meche et al. | 379/59 |
| 5,638,438 A | 6/1997 | Keen | 379/354 |
| 5,802,519 A * | 9/1998 | De Jong | 707/100 |
| 5,809,413 A | 9/1998 | Meche et al. | 455/411 |
| 5,812,954 A | 9/1998 | Henriksson | 455/550 |
| 5,819,175 A | 10/1998 | Niemi | 455/418 |
| 5,887,264 A | 3/1999 | Kohler | 455/461 |
| 5,892,475 A | 4/1999 | Palatsi | 345/352 |
| 6,141,564 A * | 10/2000 | Bruner et al. | 455/466 |
| 6,216,014 B1 * | 4/2001 | Proust et al. | 455/558 |

FOREIGN PATENT DOCUMENTS

| | | |
|---|---|---|
| EP | 0644513 A2 | 3/1995 |
| EP | 0 721 272 | 7/1996 |
| EP | 0792056 A2 | 8/1997 |
| EP | 0 860 970 | 8/1998 |
| WO | WO 98/09417 | 3/1998 |

OTHER PUBLICATIONS

GSM 11.11, version 5.5.0., prETS 300 977, pp 24–28, 77–90, 97–100.

* cited by examiner

*Primary Examiner*—Charles Appiah
*Assistant Examiner*—Charles Craver
(74) *Attorney, Agent, or Firm*—Perman & Green, LLP

(57) ABSTRACT

A method for treating a subscriber data list of the subscriber identity module of a mobile station in a linear memory of the subscriber identity module, and a subscriber identity module and a mobile station. A directory structure is formed in the memory of the subscriber identity module with the aid of a directory separator. The directory separator is for instance the symbol "/". Then for instance in the GSM system a "name" located in the "directory" is represented according to the directory structure as a term "directory/name" in the linear memory of the subscriber identity module, but the user treats the list of numbers by directories, and most preferably in an alphabetical order.

13 Claims, 3 Drawing Sheets

METHOD AND AN ARRANGEMENT FOR TREATING SUBSCRIBER DATA IN A MOBILE STATION

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The object of the invention is a method for treating a subscriber list in the subscriber identity module (SIM) of a mobile station, a subscriber identity module, and a mobile station. With a subscriber list we mean a "telephone directory" comprising subscriber identifiers with names and corresponding data attached to them. Here a subscriber identifier is primarily a telephone number, a subscriber number relating to data services, or it can contain data service control identifiers in addition to the subscriber number. Further a subscriber identifier can be conceived as subscriber identifiers containing in addition to numbers also other symbols and other contact addresses, such as electronic mail addresses.

2. Description of the Related Art

In digital mobile communication systems the user of a mobile station is identified on the basis of a subscriber identity module connected to the device. In this way calls to the user are switched to that mobile station which contains the user's subscriber identity module. Similarly, calls taken by the user are charged to the user defined by the subscriber identity module. The subscriber identity modules can be changed from one mobile station to another, whereby the subscription used by the mobile station is determined on the basis of the subscriber identity module installed in it.

The subscriber identity module is a smart card comprising a processor (CPU, Central Processing Unit), program or read only memory (ROM), data memory (EEPROM, Electrically Erasable Programmable Read Only Memory) suitable for long-term storage, and read-alter storage (RAM, Random Access Memory) suitable for storage during operation. The use of a mobile station requires that a personal identity number stored in the subscriber identity module is entered in connection with the use of the mobile station, usually when the mobile station's power is switched on. Also other information relating to the user can be stored in the data memory of the subscriber identity module. The subscriber identity module of the GSM system is described in detail for instance in the ETSI (European Telecommunications Standards Institute) standard GSM 11.11, version 5.5.0, prETS 300 977, on pages 24 to 28, 77 to 79, 90, and 97 to 100.

It is also previously known to store telephone numbers and subscriber names related to the telephone numbers in the subscriber identity module. In the subscriber identity module of GSM mobile stations said data is stored in the EEPROM memory unit where the stored data are located in elementary files (EF) and dedicated files (DF) located in a so called master file (MF). A dedicated file always contains other files, but an elementary file contains also actual data to be stored, such as telephone numbers. The elementary files and the dedicated files can further contain other elementary files and possibly also dedicated files. An elementary file comprises a header and a body part. The telephone numbers and the subscriber names are stored in the body part of the elementary files.

Further there are previously known abbreviated & fixed dialling number directories located in the subscriber identity module. The abbreviated dialling numbers are stored in the subscriber identity module's elementary files $EF_{ADN}$ and the fixed dialling numbers are stored in the elementary files $EF_{FDN}$. The subscriber identity module is further used for storing short messages. The short-messages are stored in the elementary files $EF_{SMS}$.

Fixed numbers and the names corresponding to them are stored in the records of an elementary file $EF_{FDN}$ in a linear form so that in a certain record one stored number corresponds to one stored name. The list is stored in that order in which the user stores the individual numbers, if no intermediate numbers are deleted. The simplified contents of the first three records of an elementary file of the subscriber identity module is shown in the enclosed table 1.

TABLE 1

| Record | Name of recipient | Number of recipient |
| --- | --- | --- |
| 1 | Name1 | Number1 |
| 2 | Name2 | Number2 |
| 3 | Name3 | Number3 |

One problem in the previously known methods relates to the great length of the number list. Particularly in a mobile station/subscriber identity module which is common to several users there are stored a lot of numbers, whereby it will become difficult to treat the list.

A further problem in the known methods is that only one telephone number can be stored for each name. However, nowadays many users have several subscriptions, such as a mobile phone subscription, a fixed subscription, a data subscription, a telefax subscription, an so on, and for each of them an own subscriber identifier should be stored.

OBJECT OF THE INVENTION

The object of the invention is to eliminate the above mentioned disadvantages by creating a new solution, with the aid of which the user can easily find the required connection data, even among a large amount of stored connection identifiers.

BRIEF SUMMARY OF THE INVENTION

According to one idea of the invention a directory structure is formed with the aid of a directory separator in the memory of the subscriber identity module. For instance, in that part of the record in the elementary file of the subscriber identity module which is reserved for the recipients name there is also stored a name pointing to the directory structure. Preferably the symbol "/" is used as the directory separator. For instance in the GSM system a "name" located in the "directory" is presented as a term "directory/name" according to the directory structure. It is also possible to use other symbols as the directory separator, for instance "+", "#", "*", "@", "○", "ñ", and so on.

According to the invention the user of a mobile station can handle the list of names directory by directory, where the names in a directory are preferably in an alphabetical order. An advantage of the invention is thus that a directory, which is handled in a manner according to the invention, for instance a directory with a list of names relating to a particular user contains only names used by this user, and thus it is more meaningful to scan this list of names than a list containing the numbers of several users. A further advantage of the invention is that the subscriber identity module must not necessarily control the directory structures, but the directory structure can be controlled in the mobile station.

A method according to the invention for treating subscriber data of a mobile station, whereby a subscriber identifier and a subscriber name logically related to he identifier are stored in the memory of a subscriber identity module, is characterised in that further at least one directory name logically related to said subscriber name and at least one directory separator, are stored in the memory of the subscriber identity module, whereby the separator separates said subscriber name and the directory name from each other.

A subscriber identity module comprising a memory for storing subscriber identifiers and subscriber names logically related to the identifiers, is characterised in that it further comprises means for storing at least one directory name related to said subscriber name and means for storing at least one directory separator in order to separate said subscriber name and directory name from each other.

A mobile station according to the invention, to which a subscriber identity module is related and which comprises means for storing in the subscriber identity module a subscriber identifier and a subscriber name logically related to the identifier, is characterised in that the mobile station further comprises means for storing in the subscriber identity module at least one directory name and at least one directory separator, which is logically related to said subscriber name.

Preferred embodiments of the invention are presented in the dependent claims.

BRIEF DESCRIPTION OF THE SEVERAL VIEWS OF THE DRAWINGS

The invention is described in detail below with reference to the enclosed drawings, where

FIG. 1 shows in a flow diagram a method according to the invention for storing a number in a list. In the method the number input mode, step 1, is first selected with the keys of the mobile station. If you do not enter the number into the root directory but into a lower directory, then you select that directory into which you want to enter the numbers, steps 2 and 3. If the selected directory has not been created yet, then it is created. Then the user is asked whether he wants a more lower directory, step 2. When no lower directory is selected, then the subscriber name to be stored is entered, step 4, and the subscriber identifier related to the selected subscriber name is entered, step 5. Finally in step 6 the entered data is stored in the subscriber identity module.

Table 2 shows one way to arrange the first five memory records of the subscriber identity module in a manner according to the invention.

TABLE 2

| Record | Recipient | Number of recipient |
|--------|-----------|---------------------|
| 1 | Company/Name1/Office | Number1 |
| 2 | Company/Name1/Mobile station | Number2 |
| 3 | Company/Name2 | Number3 |
| 4 | Name3 | Number4 |
| 5 | Name4 | Number5 |

Figure 1:
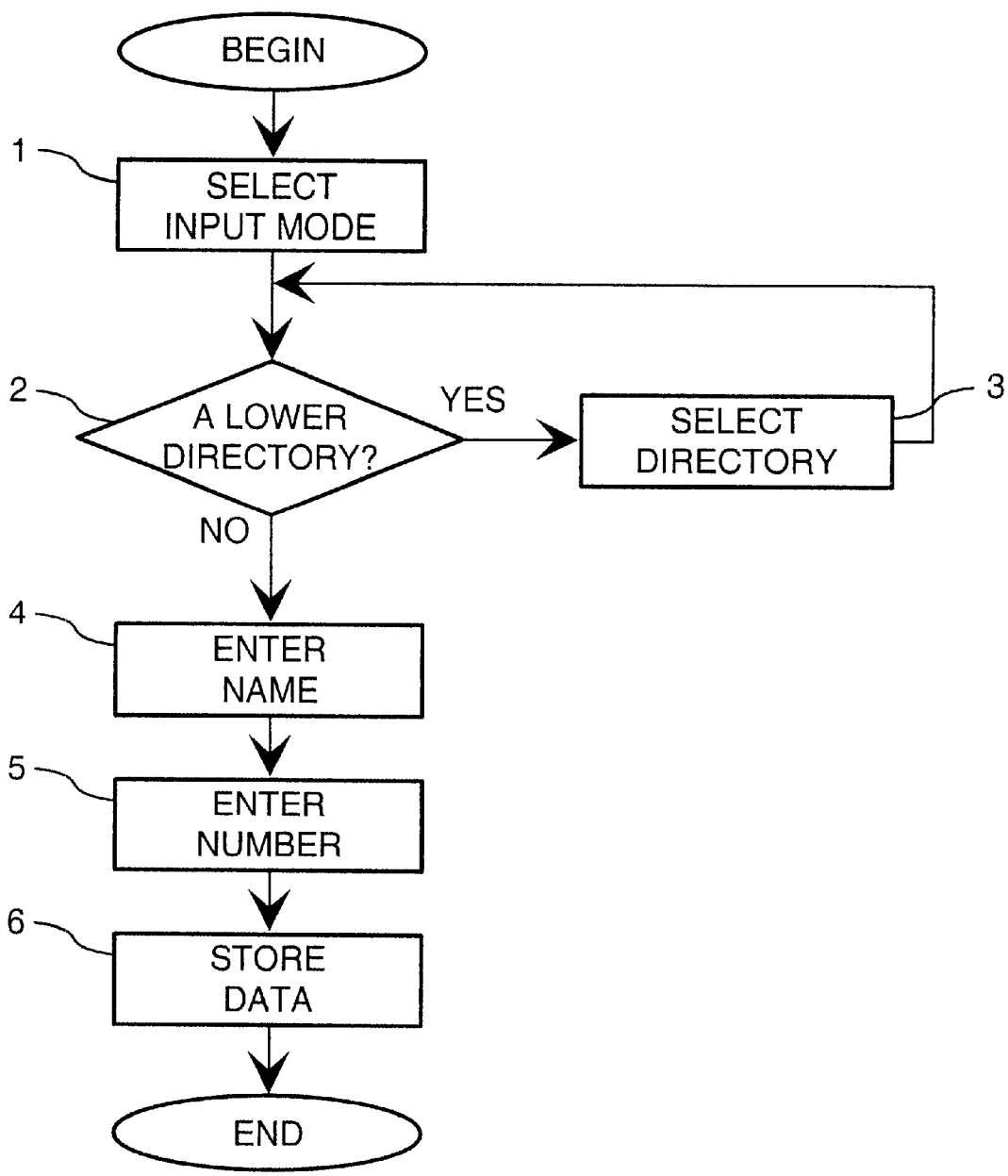
FIG. 1 shows a flow diagram of a method according to the invention for storing subscriber data in a list.
Figure 2:
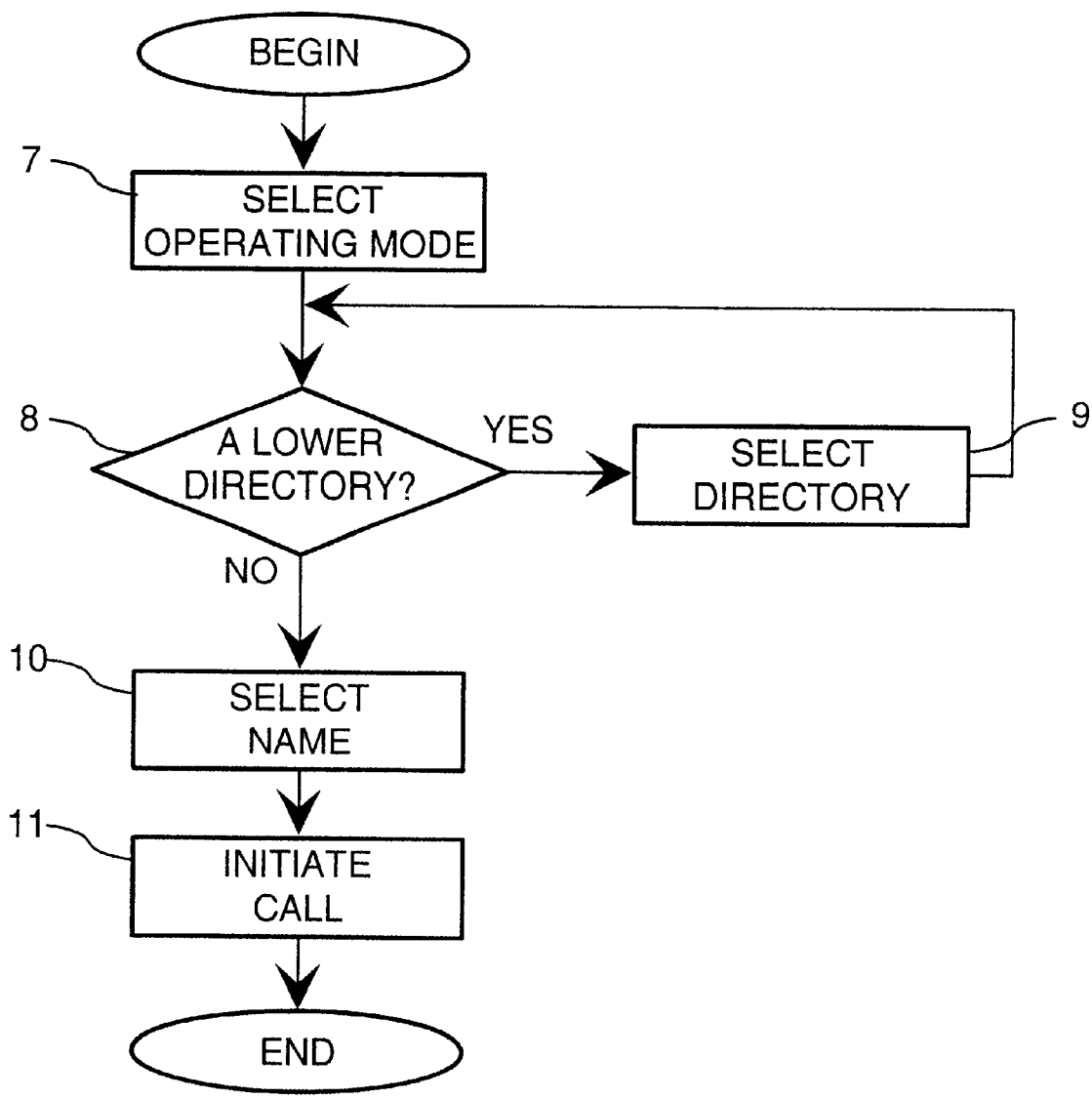
FIG. 2 shows a flow diagram of a method according to the invention for using the subscriber data list.

Thus in the solution according to the invention, when the contact data is stored in the memory of the subscriber identity module it will also include directory data, so that the contact data can be presented as a directory structure in the mobile station. FIG. 2 shows in a flow diagram a method according to the invention for using the subscriber data list. The list operating mode is selected 7 by the mobile station's keys, whereby the data can be scanned. In this situation the structure according to table 2 is seen as follows:

| Company> |
|----------|
| Name3 |
| Name4 |

After the name "Company" the character ">" is shown to indicate a directory. When you want to select a lower directory in step 8, here the "Company" directory, then it is most preferably selected with the keys, step 9. Then the display presents the data contained in the "Company" directory, for instance as follows:

| Name1 |
|-------|
| Name2 |

Here "Name1" is the name of the directory. It can be for instance the name of a person, whereby, when said directory "Name1" is selected, it results in a list having separately for instance the data "mobile phone", "fixed phone", and "telefax". "Name2" is the number of a person in the "Company" directory which can be called. If no lower directory is desired 8, then "Name2" is selected in step 10, and the call is initiated for instance by a separate key, step 11.

Figure 3:
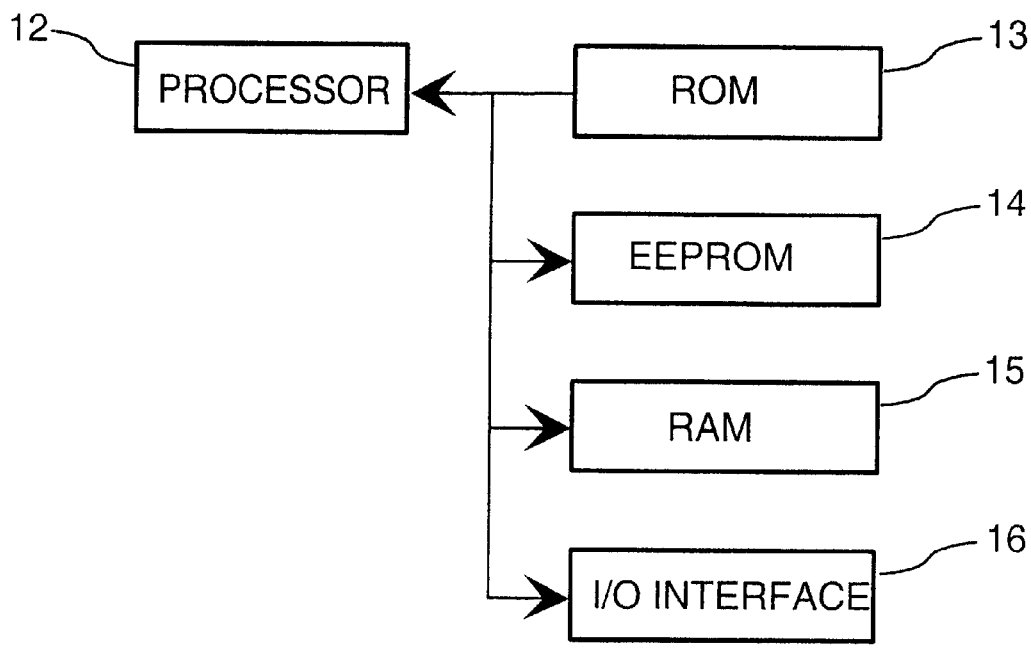
FIG. 3 shows a block diagram of a subscriber identity module according to the invention.

FIG. 3 shows components of a subscriber identity module according to the invention. The processor CPU (Central Processing Unit) 12 controls the operation of the subscriber identity module on the basis of a program code stored in the program or read only memory ROM 13. The data memory EEPROM (Electrically Erasable Programmable Read Only Memory) 14 stores non-erasable data relating to each user, which is not erased even if the subscriber identity module is removed from the mobile station. Such data is for instance a list of numbers in a directory structure. Most preferably the data memory 14 is linear, and the directory structure is formed in the mobile station using separators in the directory name in order to separate the directory names from the recipient's name. During the operation of the subscriber identity module a random access memory (RAM) 15 is used for storing temporary data. The input/output (I/O) interface 16 contains a bus adapter and a connector in order to connect the subscriber identity module to a mobile station, i.a. for transmitting the subscriber data list and for controlling these data.

Figure 4:
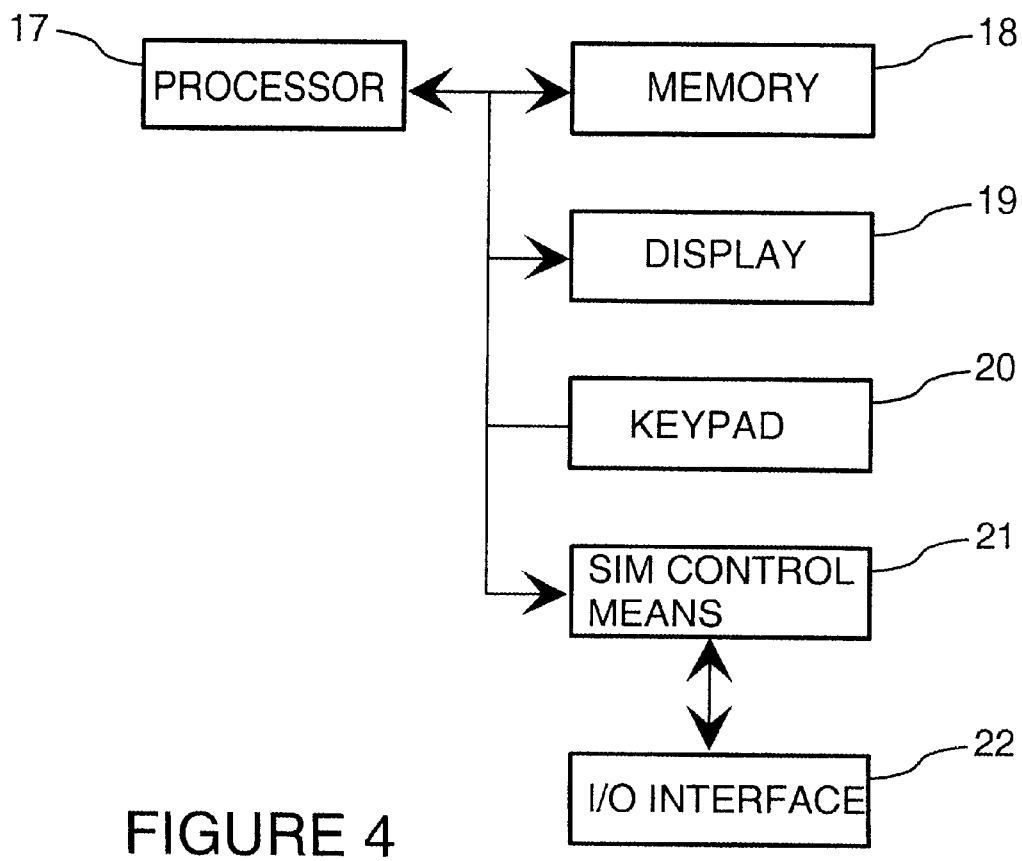
FIG. 4 shows a block diagram of the components of a mobile station according to the invention which are essential regarding the invention.

FIG. 4 shows components of a mobile station according to the invention. The mobile station comprises a processor 17 which can be used to treat the subscriber data list, and a memory 18 which can store the program required to treat the subscriber data list and the presentation protocol for the subscriber data list. The presentation protocol of the subscriber data list is intended to mean how the list is presented in the display 19 one directory at a time, in a manner according to the invention. The keypad 20 can be used to enter subscriber data. The mobile station further contains a control means 21 of the subscriber identity module, and an interface 22 for connecting the subscriber identity module. The control means 21 of the subscriber identity module secures the correct order of the instructions transferred to the subscriber identity module by receiving instructions from other blocks of the mobile station, by running the operations defined in the instructions, and by returning any results to the block which transmitted the instruction. The instructions received by the control means 21 from the other blocks are so called high level instructions, which represent a number of low level instructions transferred to the subscriber identity module. The control means 21 operates as a mediator of these instructions towards the subscriber identity module and the other blocks of the mobile station. The interface 22 connects also a clock signal for the subscriber identity module.

A SIM card used by the method according to the invention can be used also in common mobile stations where the user will see, in a manner according to the invention, the names of the directories and the recipients stored on the SIM card in a manner according to the invention, whereby the directories and the recipients are separated by the directory separator and easy to understand. The invention is not limited to be related only to the above presented embodiment examples, but many modifications are possible within the inventive idea defined in the claims.

What is claimed is:

1. A mobile station comprising:
    a subscriber identity module,
    means for storing at least two subscriber identifiers in a record in the memory of the subscriber identity module,
    means for storing at least two subscriber names corresponding to the subscriber identifiers in the record of the subscriber identity module, the subscriber names having identical directory name prefixes separated from the subscriber names by directory separators,
    means for retrieving records from the subscriber identity module,
    means for detecting whether the records' subscriber names have identical directory name prefixes separated from the subscriber names by directory separators, and
    means for displaying on the display of the mobile station single instances of detected directory name prefixes as representations of detected subscriber names with identical directory name prefixes.

2. The mobile station of claim 1, wherein the subscriber identity module further comprises:
    a memory means for storing the subscriber identifiers and the subscriber names logically related to the identifiers,
    means for storing at least one directory name prefix related to at least one subscriber name in the memory means,
    means for storing at least one directory separator in order to separate the at least one subscriber name and the at least one directory name prefix from each other in the memory means, and
    means for storing the at least one directory name prefix and the at least one subscriber name in the same record of a file in the memory means.

3. The subscriber identity module of claim 2, wherein the memory means comprises a memory for storing a number list, which memory is a linear memory.

4. The mobile station of claim 1, further comprising means for reading from the subscriber identity module at least one directory name prefix and at least one directory separator related to the directory name prefix.

5. The mobile station of claim 1, further comprising means for presenting at least one directory name prefix in a directory form with the aid of the at least one directory name prefix and at least one directory separator.

6. The mobile station of claim 1, further comprising:
    means for reading at least one record of a file, said record comprising pieces of information including atleast one directory name prefix, and at least one subscriber name, wherein the at least one subscriber name and the at least one directory name prefix are separated by one of the directory separators,
    means for arranging each piece of information read from the record into alphabetical order for presentation on the display of the mobile station, and
    means for classifying the at least one directory name prefix and the at least one subscriber name into an hierarchic structure.

7. A method for treating subscriber data of a mobile station, wherein a subscriber identifier and a subscriber name logically related to the identifier are stored in the memory of a subscriber identity module, comprising:
    storing at least two subscriber identifiers in the memory of said subscriber identity module;
    storing at least two subscriber names corresponding to said subscriber identifiers in the memory of said subscriber identity module, the subscriber names having identical directory name prefixes separated from the subscriber names by directory separators;
    retrieving records from the memory of said subscriber identity module;
    detecting whether said records subscriber names have identical prefixes separated from the subscriber names by directory separators; and
    displaying on the display of said mobile station single instances of detected directory name prefixes as representations of detected subscriber names with identical directory name prefixes.

8. The method of claim 7, wherein the directory separators comprise the symbol "/".

9. The method of claim 7, wherein the subscriber names are treated as directories.

10. The method of claim 7, wherein the subscriber names are treated in alphabetical order.

11. The method of claim 7, wherein the subscriber data is stored as a continuous structure comprising data records, of which at least one data record comprises the following data:
    at least one of the directory name prefixes,
    at least one of the directory separators,
    at least one of the subscriber names, and
    at least one of the subscriber identifiers.

12. The method of claim 7, wherein at least one directory name prefix and at least one subscriber identifier are read from the subscriber identity module by the mobile station for constituting a directory structure to be presented to a user of the mobile station.

13. The method of claim 7, further comprising:

further storing at least one directory name prefix logically related to at least one subscriber name and at least one directory separator in the memory of the subscriber identity module, with the separator separating the at least one subscriber name and the at least one directory name prefix from each other; and storing the at least one directory name and the at least one subscriber name in the same memory record of a file in the subscriber identity module for a retrieval or a presentation on the display, in a way which is determined by a presentation protocol arranged to treat the at least one directory name and the at least one subscriber name.

* * * * *